United States Patent [19]

Pratt

[11] Patent Number: 5,224,388
[45] Date of Patent: Jul. 6, 1993

[54] LOAD MEASURING DEVICE

[76] Inventor: Hugh M. Pratt, Marchioness Building, Commercial Road, Bristol, BS1 6TG, United Kingdom

[21] Appl. No.: 730,158

[22] Filed: Jul. 15, 1991

[30] Foreign Application Priority Data

Jul. 16, 1990 [GB] United Kingdom ............... 9015620

[51] Int. Cl.$^5$ .............................................. G01L 1/22
[52] U.S. Cl. .................................. 73/862.632; 73/765
[58] Field of Search ................. 73/763, 765, 767, 775, 73/828, 862.64, 862.65, 862.39, 862.45, 862.47, 862.56, 862.57; 177/211

[56] References Cited

U.S. PATENT DOCUMENTS

| 842,339 | 1/1907 | Russo | 177/211 |
|---|---|---|---|
| 2,550,588 | 4/1951 | Oberholtzer . | |
| 3,722,268 | 3/1973 | Crooke et al. | 73/862.39 |
| 4,142,405 | 3/1979 | Stevens | 73/763 |
| 4,283,942 | 8/1981 | Fishfader | 73/862.39 |
| 4,566,339 | 1/1986 | Davidson et al. | 73/862.39 |
| 4,605,829 | 8/1986 | Zacharias . | |
| 4,803,886 | 2/1989 | May et al. | 73/862.39 |
| 4,847,794 | 7/1989 | Hrubes | 73/765 |
| 4,977,783 | 12/1990 | Pratt | 73/862.39 |

FOREIGN PATENT DOCUMENTS

| 897116 | 5/1962 | United Kingdom . | |
|---|---|---|---|
| 903941 | 8/1962 | United Kingdom . | |
| 2041549 | 9/1980 | United Kingdom | 73/862.39 |
| 2205411 | 12/1988 | United Kingdom . | |

Primary Examiner—Jerry W. Myracle
Attorney, Agent, or Firm—Spensley Horn Jubas & Lubitz

[57] ABSTRACT

A load measuring device has a plurality of links 2 arranged in a chain to which a load to be measured is applied, respective sensing elements G disposed on two or more links for detecting the strain on the links 2 and giving output signals dependent on the strains, and electronic processing circuitry including a microcomputer system 12 to process the signals and to compute a value for the applied load.

14 Claims, 2 Drawing Sheets

LOAD MEASURING DEVICE

The invention relates to a load measuring device, and in particular to a load measuring device having a plurality of links arranged in a chain, and sensing means arranged on a link for sensing the strain in the link.

Such load measuring devices are utilised in many situations where it is desired to monitor or measure loads, for example in construction work where heavy objects are lifted by cranes, or in situations where objects are being towed or dragged using cables or chains, such as the towing of barges by tugs, or in the logging industry where logs are towed behind traction vehicles.

A basic load measuring device consists of a mechanical link provided with electronic circuitry including a sensor which responds to the elastic distortion in the mechanical link. A variety of sensors for detecting elastic distortion are presently available, including for example foil strain gauges which alter in electrical resistance in response to the strain on the link. A further sensor comprises a simple coil wound around a side of a link, the variations in the magnetic properties of the link in response to applied stress causing a change in the current flow in the wire which is indicative of the stress level.

A difficulty exists with a load measuring device as described above, in that such devices are generally unacceptably inaccurate when operating with loads below a certain percentage of their maximum load capacity. For example, where such devices are used for Official Weights and Measures purposes, they are typically accurate down to about 4% of maximum capacity. For other uses this figure may reach 10% of maximum capacity. The present invention seeks to provide a measuring device having an extended load measuring range, for a given required accuracy, or an increased accuracy at a given load.

According to the present invention there is provided a load measuring device comprising a plurality of links arranged in a chain, to which a load to be measured is applied, respective sensing means disposed on two or more links for detecting the strain in the links and giving output signals dependent on the strain in those links, and processing means to process the output signals and to compute a corrected signal indicative of the applied load.

The utilisation of two or more sensing means provided on separate links provides separate output signals which can be manipulated to provide a single signal of increased accuracy.

Preferably, at least four links are provided, with sensing means disposed on four links. Preferably, the sensing means comprise strain gauges.

The processing means may include a microcomputer system, which is programmed to sum the signals from the sensing means disposed on separate links. By summing these signals a signal of increased signal/noise ratio is obtained which may be utilised to provide a corrected signal of increased accuracy indicative of the applied load, or, for a required accuracy, to effectively extend the lower limit of acceptable measurement of the device. For example, by providing four signals for summation the lower acceptable limit of measurement is extended to approximately ¼ of the limit where only a single sensing means is utilised.

Preferably, the microcomputer system is programmed to sum only those signals from the sensing means of separate links which do not differ from each other by more than a predetermined amount. In this way, spurious signals which might be the result of component malfunctions can be disregarded in the signal summation.

A further problem with known load measuring devices is that the sensor output is not linearly dependent on the applied load. Mechanical links are available which have been specially machined to allow linear outputs to be obtained. Such links are however particularly difficult and very expensive to produce.

Preferably, the microcomputer system is arranged to output a corrected signal which is linearly dependent on the applied load, by comparing the input signals with a calibration curve. This dispenses with the need for specially manufactured mechanical links. By effecting the linearisation by means of the electronics, rather than using specially prepared links, a particularly cheap linearised device can be produced. Any commercially available links can then be utilised provided they have the appropriate strength for the loads to be applied.

Preferably an archival memory is connected to the microcomputer system which is arranged to record the loading history of the device.

The device may include a radio transmitter for transmitting the corrected signal indicative of the applied load to a remote receiver at which the signal is received and the value of the applied load is displayed.

Embodiments of the invention are described, by way of example only, with reference to the following drawings in which.

Figure 1:
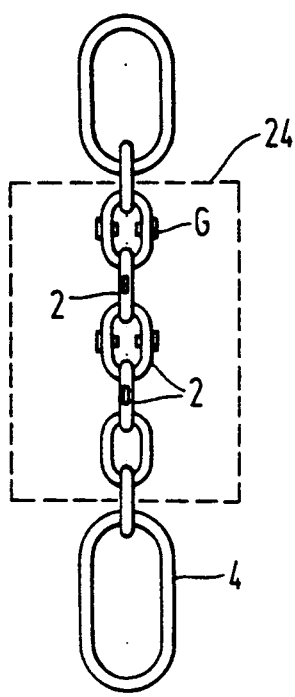
FIG. 1 shows the arrangement of mechanical links of the measuring device.

Turning firstly to FIG. 1, a series of oval mechanical links 2 are arranged in a chain between larger-sized links 4 which facilitate attachment of the chain to an applied load.

A number of the links 2 are provided with sensing means in the form of strain gauges G mounted on the links so as to undergo extension with the links on loading. FIG. 1 shows strain gauges provided on four links 2. The strain gauges G are foil strain gauges which are mounted on the links and which consist of plastics foils provided with a plurality of fine wires. On the extension of the link on loading, the gauges change their resistance according to the extension, and hence to the applied load. Such foil strain gauges are commercially available, as for example, No. RS 632-124 Tokyo Sokki Kenkyujo Ltd.

Alternatively, any other sensing means which produce an output indicative of the elastic distortion in a link may be used. For example, a coil wound around a side of a link may be used.

Figure 2:
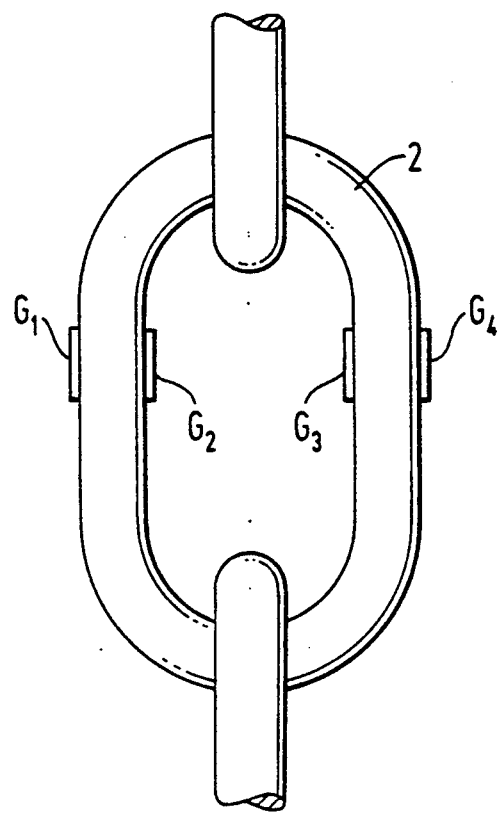
FIG. 2 is an enlarged view of a link of FIG. 1.
Figure 3:
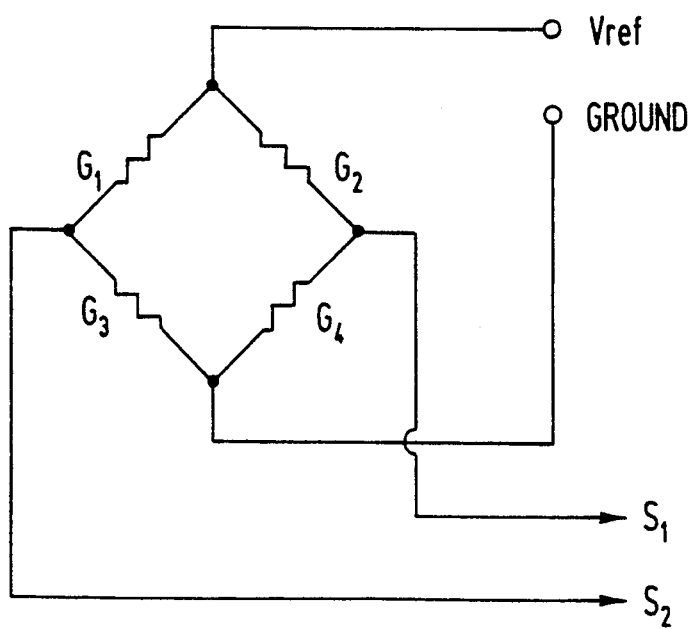
FIG. 3 shows a bridge circuit of strain gauges.

Each mechanical link 2 may be provided with from one to four strain gauges. FIG. 2 shows four strain gauges $G_1$, $G_2$, $G_3$, $G_4$ arranged on a link 2. These can be mounted on the links 2 in any position which experiences an extension with loading of the chain. It is found that a particularly effective response is produced if the strain gauges $G_1$, $G_2$, $G_3$, $G_4$ are positioned on opposing sides of a link as shown in FIG. 2. Where four strain gauges $G_1$, $G_2$, $G_3$, $G_4$ are utilised, these are electrically connected in a bridge arrangement, as shown in FIG. 3. A voltage, indicated by Vref—Ground is applied across the bridge, whilst the voltage at the arms of the bridge, $S_1$, $S_2$ are indicative of the strains experienced by the guages, and hence of the applied loads. Alternatively, where less than four strain gauges are used on a link 2, gauges can be substituted by standard resistors in the bridge circuit; for example, the link could include only two strain gauges, G1 and G2 with G3 and G4 substituted by standard resistors. It is to be appreciated that the bridge circuit merely provides a convenient arrangement of strain gauges, and that any arrangement which provides an output signal indicative of applied load can be utlised.

Figures 4, 5:
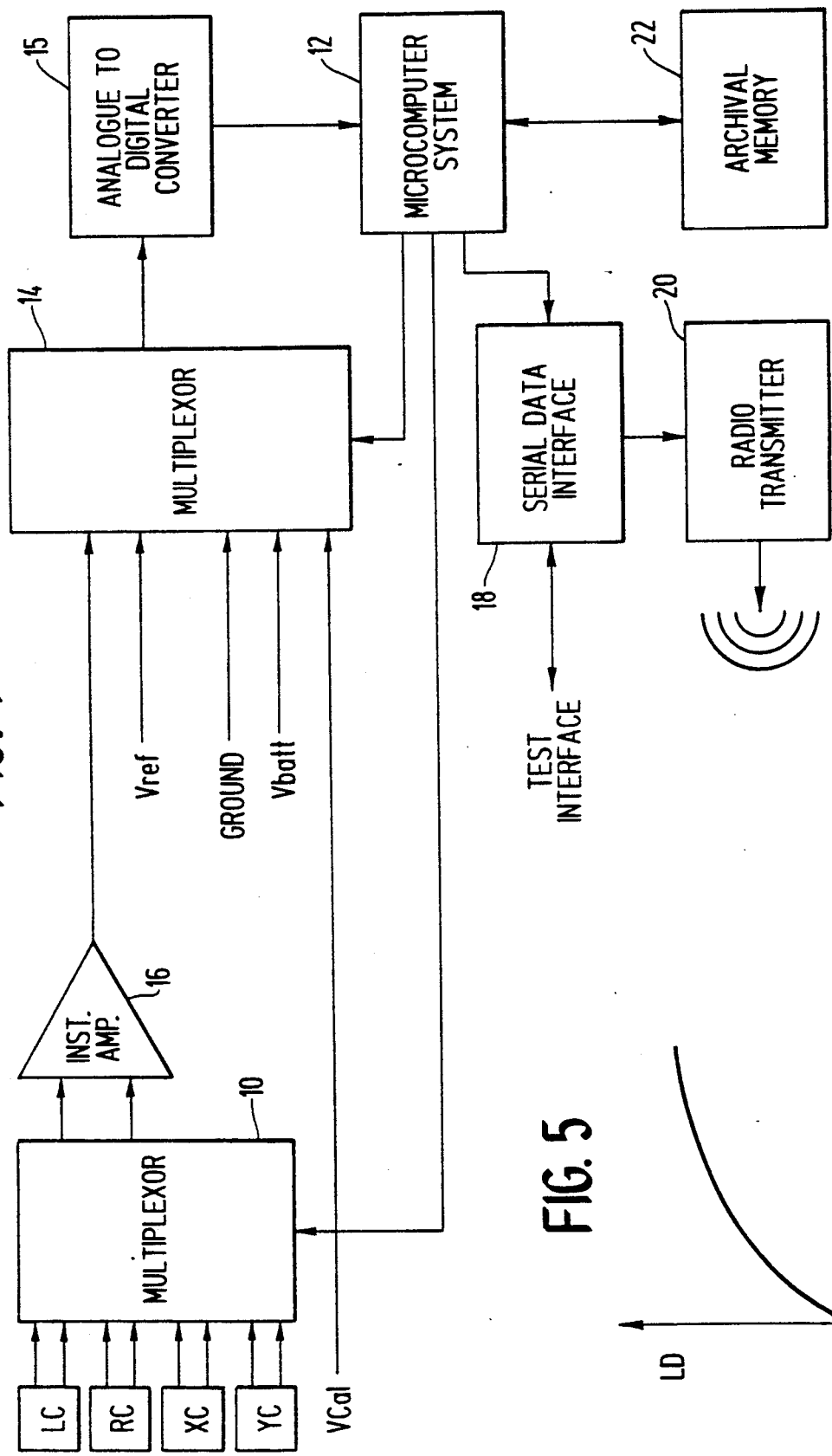
FIG. 4 is a schematic diagram showing the interconnection of the electronic components of the device.
FIG. 5 shows a predetermined calibration curve for providing a corrected output.

The outputs from the sensing means on each link 2 indicated by LC, RC, XC, YC in FIG. 4 are connected to a first multiplexor 10 functioning as a switching element to selectively control the flow of signals from the various sensing means. The operation of the first multiplexor 10 is controlled by a microcomputer system 12. Signals from the first multiplexor 10 are passed to a second multiplexor 14 via an instrumentation amplifier 16 which provides signal amplification. A typical amplifier which can be used has RS No. 308-815 (C.I.L. Electronics Ltd.). The second multiplexor 14 is additionally connected to a number of reference voltages required in order that the system provide internal self-checks. For example FIG. 3 shows V batt, representing the battery voltage, which is monitored to ensure the battery voltage is sufficient for correct functioning of the electronic components. V ref and Ground represent voltages supplied at the bridge as is shown in FIG. 3. V Cal represents a preselected voltage equivalent to a known load which may be utilised in providing checks on the correct functioning of the electronic components. This second multiplexor 14 is also controlled by the microcomputer system 12. A commerically available multiplexor which can be used for both the first and second multiplexors 10 and 14 is RS 639-850 (National Semiconductor Ltd.).

Signals from the second multiplexor 14 are digitised in the analogue to digital convertor 15, before input to the microcomputer system 12. A typical analogue/digital convertor which may be used is RS No. 647-435 (Analogue Devices Ltd.).

The microcomputer system 12 is arranged to process the signals from the various sensing means to yield an accurate output which is linearly dependent on the true load on the cell. The signals from the various sensing means are summed to provide a single signal $S_{sum}$ of increased signal/noise ratio. This signal $S_{sum}$ is then effectively compared with a predetermined calibration curve to provide a corrected output which is linearly dependent on the applied load. As discussed previously, the summation of signals increases the reliability of the computed load, at a given load, or effectively increases the lower limit of use of the device for a given reliability.

For example, the input signal LC is corrected by the microcomputer system 12 to corrected signal LT as follows:

$$LT = AL + BL(LC) + CL(LC)^2 + DL(LC)^3 + \ldots$$

wherein AL, BL, CL, DL ... etc. are predetermined calibration coefficients. The corrected outputs for the other inputs to the microcomputer are calculated in a similar fashion.

By utilising sensing means associated with a number of different links 2 each independantly providing signals indicative of the applied load, a comparison can be made between the signals from the different sensing means. An apparent spurious signal which varies from the signals given by other sensing means by more than a preselected amount (which would indicate faulty equipment) can be rejected in the signal summation and hence in the load computation.

As an alternative, the microcomputer 12 can be programmed to sum signals from say only two sensing means when the device is being operated with loads well above its lower limit of accuracy, and when smaller loads are used, which approach the device's lower limit of accuracy, to include signals from other sensing means in the summation.

Calibration of the device can be achieved by using known loads to compute an applied load versus signal curve, and applying a polynomial curve to extrapolate between points. A theoretical linear response is also computed so that for any input signal a corrected output signal corresponding to that load is computed, with the corrected output signal being directly proportional to the applied load.

For example, the calibration coefficients for the input signal LC are derived when LD, the digital input to the microcomputer system 12, is compared with a known load LT applied to the sensor as follows:

$$LT \text{ (known load)} = AL + BL(LD) + CL(LD)^2 + DL(LD)^3 + \ldots$$

to generate an applied load signal LT vs. signal LD curve as shown in FIG. 5.

Output signals from the microcomputer system 12 are sent via a signal data interface 18 (for example RS No. 655-290 (Maximum Integrated Products Ltd.)) where the computer output is transferred into a transmissible format, to a radio transmitter 20 at which the output data is transmitted to a remote receiver. A receiver module remote from the transmitter receives the transmitted data and is arranged to provide a real time display of the applied load on an LCD or LED display. An example of a radio transmitter which may be utilised is the TT405 manufactured by Wood and Douglas. Where remote sensing of the load is not required the radio transmitter/receiver link can be replaced by a simple wire link.

Other computers can be connected to the microcomputer system 12 via the serial data interface 18, for example, for carrying out tests on the device.

Although the embodiment described uses a microcomputer system to carry out the signal control and load computation, an appropriately arranged microprocessor can alternatively be used.

A further feature which may be incorporated into the device is an additional memory in the form of an archival memory 22. This is connected to the microcomputer system 12, and is used for storing the service history of the device, by for example, storing a complete record of loading against time, or recording loading only above a preselected load threshold, or alternatively, recording loading against time only on unloading of the cell. Such a record is useful particularly in accident or failure investigation where precise loading details at the time of failure are very important. A typical memory which may be used is RS No. 657 202 (Mitsubishi Ltd.) memory card.

The entire device including the electronic components and links 2 provided with the sensing means are contained within a housing 24, indicated by the dotted lines on FIG. 1. The larger-sized links 4 are outside the housing 24. The device thus forms a stand-alone sensing and transmitter module for interposition into a loaded line.

I claim:

1. A load measuring device comprising a plurality of links arranged in a chain, to which a load to be measured is applied, a first sensing means disposed on a first link for detecting the strain in the first link and giving a first output signal dependent on the strain in the first link and a second sensing means independent of the first sensing means and disposed on a second link for detecting the strain in the second link and giving a second output signal dependent on the strain in the second link, and processing means to process the first and second output signals from the first and second sensing means and to compute a corrected signal indicative of the applied load as a function of both of the strains detected in the first and second links, respectively.

2. A load measuring device according to claim 1 wherein at least four links and four sensing means are provided, and wherein a sensing means is disposed on each of the four links.

3. A load measuring device according to claim 1 wherein each sensing means comprises strain gauges.

4. A load measuring device according to claim 3 wherein each link has two elongated portions and wherein four strain gauges are arranged on each link with two of said four strain gauges being mounted on opposing sides of each elongated portion of the link.

5. A load measuring device according to claim 1 wherein the processing means includes a microcomputer system.

6. A load measuring device according to claim 5 wherein the microcomputer system is programmed to sum the signals from the sensing means of the first and second links.

7. A load measuring device according to claim 5 wherein an archival memory is connected to the microcomputer system and is arranged to record the loading history of the device.

8. A load measuring device according to claim 1 including a radio transmitter for transmitting the corrected signal indicative of the applied load to a remote receiver at which the transmitted signal is received and the value of the applied load is displayed.

9. A load measuring device according to claim 1 wherein test means are provided to allow testing of the processing means.

10. A load measuring device comprising a plurality of links arranged in a chain, to which a load to be measured is applied, respective sensing means disposed on two or more links for detecting the strain in the links and giving output signals dependent on the strain in those links, and processing means to process the output signals and to compute a corrected signal indicative of the applied load, said processing means including a microcomputer system which is programmed to sum only those signals from the sensing means of separate links which do not differ from each other by more than a predetermined amount and to output a corrected signal which is linearly dependent on the applied load by comparing the input signals with a calibration curve.

11. A method of measuring a load applied to a plurality of links arranged in a chain, comprising the steps of:
    detecting the strain in a first link and giving a first output signal dependent on the strain in the first link;
    detecting the strain in a second link and giving a second output signal dependent on the strain in the second link; and
    processing the first and second output signals to compute a corrected signal indicative of the applied load as a function of the first and second output signals dependent on the strains detected in the first and second links, respectively.

12. The method of claim 11 wherein the processing step includes summing the first and second output signals.

13. The method of claim 11 further comprising the steps of detecting the strains in a plurality of additional links and giving a plurality of additional output signals, each output signal being dependent on the strain in an additional link and wherein the processing step includes processing all of the output signals and computing a corrected signal indicative of the applied load as a function of a selected plurality of output signals dependent on the strains detected in the associated links.

14. The method of claim 13 wherein the selected plurality of output signals, of which the corrected signal is a function, excludes those output signals which differ from the selected plurality of output signals by more than a predetermined amount.

* * * * *